United States Patent [19]

Wenger et al.

[11] Patent Number: 4,875,847

[45] Date of Patent: Oct. 24, 1989

[54] TWIN-SCREW EXTRUDER HAVING RESPECTIVE CONICAL NOSE SCREW SECTIONS

[75] Inventors: LaVon G. Wenger; Bobbie W. Hauck; Timothy R. Hartter, all of Sabetha, Kans.

[73] Assignee: Wenger Manufacturing, Inc., Sabetha, Kans.

[21] Appl. No.: 298,863

[22] Filed: Jan. 17, 1989

Related U.S. Application Data

[63] Continuation of Ser. No. 165,460, Mar. 2, 1988, abandoned, which is a continuation of Ser. No. 794,252, Oct. 30, 1985, abandoned, which is a continuation of Ser. No. 603,195, Apr. 23, 1984, abandoned.

[51] Int. Cl.⁴ .............................................. B29C 47/40

[52] U.S. Cl. ................................ 425/204; 264/176 R; 264/211.21; 366/83; 366/85; 366/88; 366/89; 425/205; 425/208; 425/379.1

[58] Field of Search .................... 264/176 R; 425/208, 425/72.1, 204, 205, 379.1, ; 366/83, 84, 85, 88, 89, 322, 323

[56] References Cited

U.S. PATENT DOCUMENTS

| | | | |
|---|---|---|---|
| 2,231,357 | 2/1941 | Burghauser et al. | 366/85 |
| 2,615,199 | 10/1952 | Fuller | 425/192 R |
| 2,693,348 | 11/1954 | Ellermann | 366/85 |
| 2,698,962 | 1/1955 | Swallow | 264/349 |
| 3,060,512 | 10/1962 | Martin et al. | 264/176 R |
| 3,070,836 | 1/1963 | De Haven et al. | 264/40.7 |
| 3,082,816 | 3/1963 | Skidmore | 159/49 |
| 3,114,171 | 12/1963 | Colombo | 366/85 |
| 3,143,767 | 8/1964 | Wirth et al. | 366/85 |
| 3,195,868 | 7/1965 | Loomans et al. | 366/85 |
| 3,198,491 | 8/1965 | Loomans et al. | 366/77 |
| 3,423,074 | 1/1969 | Loomans | 366/301 |
| 3,463,459 | 8/1969 | Loomans et al. | 366/77 |
| 3,525,124 | 8/1970 | Ocker | 425/379 R |
| 3,605,188 | 9/1971 | McCormick | 425/205 |
| 3,640,669 | 2/1972 | Hanslik | 425/376 R |
| 3,779,522 | 12/1973 | Loomans | 366/85 |
| 3,883,122 | 5/1975 | Werner | 366/85 |
| 3,904,719 | 9/1975 | Fritsch | 264/176 R |
| 3,917,507 | 11/1975 | Skidmore | 425/204 |
| 4,025,058 | 5/1977 | Mizuguchi | 425/204 |
| 4,136,251 | 1/1979 | Bice et al. | 366/85 |
| 4,185,123 | 1/1980 | Wenger et al. | 426/272 |
| 4,218,146 | 8/1980 | Housz | 366/78 |
| 4,423,960 | 1/1984 | Anders | 366/85 |
| 4,454,804 | 6/1984 | McCulloch | 425/72 R |
| 4,474,473 | 10/1984 | Higuchi et al. | 366/85 |

FOREIGN PATENT DOCUMENTS

| | | | |
|---|---|---|---|
| 1274797 | 8/1968 | Fed. Rep. of Germany | 425/208 |
| 410969 | 5/1974 | U.S.S.R. | 425/322 |

*Primary Examiner*—Jay H. Woo
*Assistant Examiner*—Timothy W. Heitbrink
*Attorney, Agent, or Firm*—Hovey, Williams, Timmons & Collins

[57] ABSTRACT

A twin screw extruder which significantly reduces extruder wear through provision of separate, complemental, interfitted frustoconical screw and barrel sections adjacent the outlet end of the extruder barrel which create an even, bearing-type support for the rotating screws as material passes through the apparatus. In preferred forms, the screws are intermeshed along the majority of the extruder barrel, but diverge at the region of the final frustoconical screw sections and are received within respective complemental barrel sections; in this fashion the material being processed is split into juxtaposed, non-communicating streams, and thereby evenly flows around and supports the adjacent screw section to lessen the tendency of the screws to separate themselves and come into wearing contact with the surrounding barrel walls. The extruder can be used to process a wide variety of plant-derived materials, but is particularly useful for viscous substances (e.g., soy concentrates and isolates) which can be difficult to handle with mono-screw extruders.

8 Claims, 2 Drawing Sheets

TWIN-SCREW EXTRUDER HAVING RESPECTIVE CONICAL NOSE SCREW SECTIONS

This application is a continuation of application Ser. No. 07/165,460, filed 03/02/88 now abandoned which is a continuation of S/N 06/794,252, filed 10/30/85 now abandoned; which was a continuation of S/N 06/603,195, filed 4/23/84 now abandoned.

BACKGROUND OF THE INVENTION

1. Field of the Invention

The present invention is broadly concerned with an improved twin screw extruder especially designed to reduce wear by minimizing the tendency of the screws to separate during rotation thereof and come into wearing contact with the extruder barrel walls; more particularly, it is concerned with such an extruder construction, and a corresponding method, wherein respective, juxtaposed, complemental screw and barrel sections are provided adjacent the outlet end of the extruder in order to provide substantially even distribution of pressure and material resulting in a bearing-type support for the separate screws.

2. Description of the Prior Art

Generally speaking, extruders are industrial devices which include an elongated, tubular barrel, a material inlet at one end of the barrel and a restricted orifice die adjacent the remaining end thereof. One or more elongated, axially rotatable, flighted extrusion screws are situated within the barrel, and serve to transport material along the length thereof. Moreover, the overall extruder is designed to heat, pressurize and render flowable material being processed, typically through the use of high shear and temperature conditions. Extruders have been used in the past to process a wide variety of materials, such as thermoplastic resins and plant-derived materials. In the latter instances, the extruders serve to cook and process the material. A wide variety of plant-derived materials have been processed using extruders, with perhaps the most notable examples being soy, corn and wheat.

One class of extruder in widespread use is the single screw extruder, which includes a single, elongated extruder screw within a substantially circular barrel. Extruders of this type are commonly used for processing plant-derived materials, and have proven over the years to be highly successful. Another general class of extruders are the so-called twin screw machines, which have a pair of juxtaposed elongated, flighted screws within a complemental barrel having a pair of side-by-side, frustocylindrical sections. The screws in such a twin screw machine can be counterrotating (i.e., the screws rotate in an opposite direction relative to each other), or corotating, (i.e. both screws rotate either clockwise or counterclockwise). Twin screw extruders have found wide application in the past, particularly in the plastics industry, although these extruders have also been used for processing of plant-derived materials as well.

One of the chief advantages of a twin screw extruder, as compared with a mono-screw machine, is that the twin screw device operates more in the manner of a positive displacement pump. That is to say, with mono-screw extruders there is considerble fore and aft movement of the material as it progresses along the length of the barrel (such machines can be characterized as drag flow devices), and this can lead to inefficiencies, particularly when extremely viscous materials are being processed. In the case of a twin screw machine though, this fore and aft "slippage" of material during processing is substantially reduced or eliminated. Thus, in handling extremely viscous material such as synthetic resins or the like, twin screw extruders are normally the apparatus of choice.

Despite these advantages however, twin screw extruders have presented severe operational problems in their own right. Perhaps the most significant problem in connection with the twin screw machines in the fact that they exhibit a marked tendency to prematurely wear out machine components. Specifically, with a twin screw machine, build-up of pressures at the region where the screws are intermeshed develops outwardly directed forces which tend to separate the screws and effectively push the screws into wearing contact with the adjacent barrel walls. This in turn leads to rapid wear of the screw and barrel components, with the result that maintenance costs and the down time are increased. Indeed, it is not unknown in the extruder art to hear a twin screw extruder "rumble" by virtue of the screws coming into undue rubbing contact with the barrel walls during operation.

Another problem sometimes encountered with twin screw extruders is the velocity differential developed in the material at the outboard regions of the extruder screws, as compared with the regions where the screws are intermeshed. That is to say, material passing along the extruder adjacent the outboard regions of the screw tends to move at a faster rate than does material passing along the extruder at the region where the screws are intermeshed. This can be most graphically seen at the outlet of the extruder, where material will pass through outboard die apertures at a greater rate than through the central apertures. As can be appreciated, such a differential velocity is to be avoided, inasmuch as it can lead to uneven cooking and flow conditions within the extruder. In the past, attempts have been made to eliminate this differential velocity problem by provision of elongated die spacers between the ends of the screws and the actual extrusion dies. While this does tend to decrease the velocity differential, use of such die spacers can lead to dead spots or areas of stagnation and consequent burning or scorching of material being processed. This problem is most critical in the extrusion of foodstuffs or another biological materials.

Russian Pat. No. 410969 describes a twin screw plastics extruder having a short, unflighted bullet affixed to the foward end of each screw. This construction is deemed deficient for a number of reasons, most especially because the smooth, unflighted bullets of the Russian patent do not provide any positive transport of material along the bullet length, and further may not give substantially even distribution of material and pressure around the peripheries of the bullets.

Accordingly, while twin screw extruders have undeniable advantages, they also exhibit several significant disadvantages which have tended to limit their utility.

SUMMARY OF THE INVENTION

The present invention is concerned with an improved twin screw extruder which is specially designed to alleviate or minimize many of the problems noted above. Broadly speaking, the extruder of the invention includes an elongated barrel presenting an inner elongated zone in general figure 8 shape having parallel, intersecting cylinder-defining walls along a portion of the length thereof. A material inlet is provided adjacent one end of the barrel, along with a pair of separate, diverging, generally tubular, juxtaposed head sections proximal to the other, outlet end of the barrel. Each of the outlet end head sections is of decreasing cross-sectional area along its length, and in preferred forms it is of frustoconical configuration. A pair of elongated, juxtaposed, axially rotatable flighted screws are positioned within the extruder barrel for moving material therethrough, and each screw includes an elongated section of decreasing cross-sectional area along its length which is substantially complemental with a corresponding one of the tubular head sections. Die means is provided adjacent the outlet end of the tubular head sections for extrusion of material after passage thereof through the barrel. Very importantly, each of the decreasing cross-sectional area outlet end screw sections extends into and is substantially complementally received by a corresponding head section, and this provides a bearing-type support for each screw adjacent the outlet end of the barrel. Thus, as material passes through the extruder barrel, it is split and divided into separate, juxtaposed, non-communicating streams, with the result that each stream of material is caused to substantially flow evenly around and support the adjacent screw which is situated and rotating within the separate stream of material. In short, the extruder construction of the invention provide a bearing support for each screw adjacent the outlet or die end of the extruder which effectively minimizes the tendency of the screws to separate and wear.

In preferred forms, the extruder screws include intermeshed flight means thereon (which may be single or multiple flighted and include cut flight portions along the length thereof to somewhat impede the pumping action of the screws), and the screws may be either co-rotating or counter-rotating as desired.

A wide variety of materials can be processed using the extruder of the invention, but it is particularly contemplated that the extruder be employed for the processing of plant-derived materials.

DESCRIPTION OF THE PREFERRED EMBODIMENTS

Figures 1, 2, 3, 4:
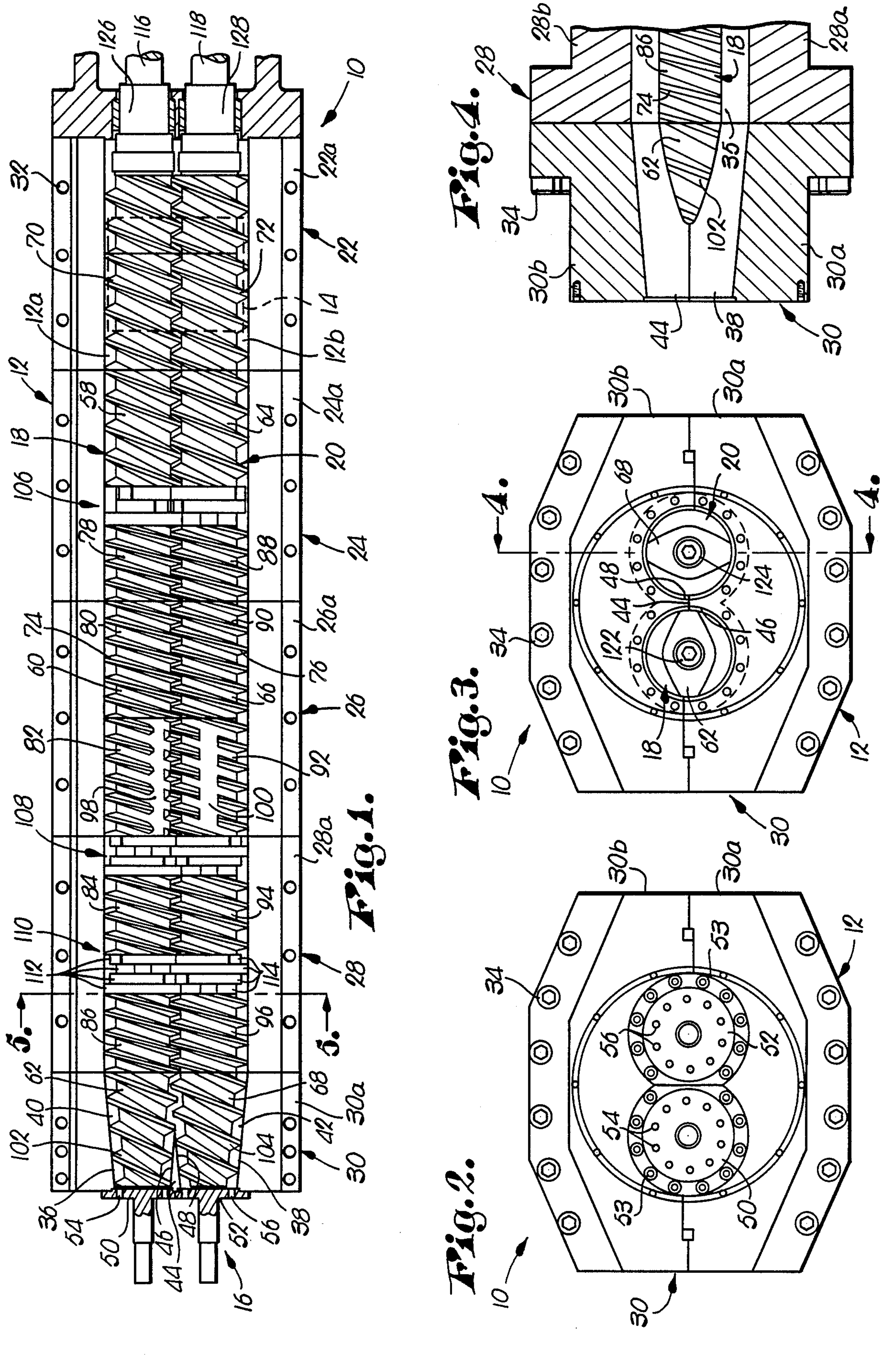
FIG. 1 is a fragmentary, sectional view illustrating the barrel and screw of the preferred twin screw extruder of the invention.
FIG. 2 is an end elevational view of the die or outlet end of the extruder illustrated in FIG. 1.
FIG. 3 is a view similar to that of FIG. 2, depicts the extruder with the end die plates removed.
FIG. 4 is a fragmentary, vertical sectional view taken along line 4—4 of FIG. 3 and with one of the screws removed.

Turning now to the drawings, and particularly FIGS. 1–5, an extruder 10 is depicted which broadly includes an elongated barrel 12 having a material inlet 14 adjacent the rear end thereof and restricted orifice die means 16 adjacent the remaining, outlet end of the barrel. In addition, the overall extruder 10 includes a pair of elongated, juxtaposed, axially rotatable, substantially parallel flighted screws 18, 20 situated within barrel 12 and serving to transport material from inlet 14 along the length of the barrel and through the die means 16.

In more detail, it will be seen that the barrel 12 includes a tubular inlet head 22, three intermediate tubular heads 24, 26 and 28, and a final tubular outlet head 30. Each of the heads 22–30 is made up of interconnected half-head sections, with only the lower sections 22*a*–30*a* being depicted in FIG. 1. However, as will be seen from a consideration of FIGS. 2–5, each of the heads includes a mated upper half section 22*b*–30*b*. The upper and lower half sections of each head are bolted through vertical apertures 32 provided along the side margins of the half-head sections. Moreover, the sections are connected in an aligned, end-to-end manner as best seen in FIG. 1 through provision of apertured endmost flange structure provided on the opposed ends of each head, and by means of appropriate connecting bolts 34.

The interconnected heads making up the overall barrel 12 serve to define an inner tubular region presenting side-by-side, elongated, parallel, lengthwise interconnected frustocylindrical zones 12*a* and 12*b* for receiving the respective screws 18, 20 as will be more fully explained hereinafter. In addition, the internal walls of the tubular heads 22–30 cooperatively present elongated, opposed, somewhat V-shaped in cross-section upper and lower saddle areas 35 (see FIG. 5 between the zones 12*a* and 12*b*. The head walls may be smooth, helically flighted, or provided with internally extending, longitudinal ribs, as may be desired.

The inlet head 22 and intermediate heads 24–28 are for the most part conventional. However, outlet head 30 is configured to present a pair of separate, generally tubular, juxtaposed head sections 36, 38. Each of the head sections 36, 38 is of decreasing cross sectional area along its length, and is preferably frustoconical in shape. To this end, outlet head 30 includes a pair of converging, arcuate, outboard sidewalls 40, 42 along with a central arcuate wall 44. The wall 44 presents a pair of arcuate converging surfaces 46, 48 which merge into the respective opposed outboard sidewalls 40, 42. Thus, the wall structure of head 30 serves to define a pair of side-by-side, generally tubular, frustoconical sections 36, 38. The section 36 is defined by wall 40 and surface 46, whereas the section 38 is defined by wall 42 and surface 48. Furthermore, and referring specifically to FIG. 4, it will be seen that the central wall 44 effectively serves to create and separate the head sections 36, 38, so that material advancing along the length of barrel 12 is divided and received within the respective sections 36, 38. The importance of this constructional feature will be made clear hereinafter.

Die means 16, in the embodiment of FIGS. 1–5, is in the form of a pair of apertured die plates 50, 52 bolted to the respective, smallest diameter ends of the head sections 36, 38 by bolts 53. Each of the die plates is substantially circular, but presents an inboard flattened face which abuts the corresponding flattened face of the adjacent die, as best seen in FIG. 2. The die plates 50, 52 include a series of circularly arranged die apertures 54, 56, but other die openings and arrangements thereof are possible. Again referring to FIG. 1, it will be seen that die plate 50 covers the generally circular outlet opening presented by the frustoconical head section 36, and that the die openings 54 are in communication with the interior of the section 36. Similarly, the plate 52 covers the outlet end of frustoconical head section 38, with the die apertures 56 being in communication with the interior of the latter.

The screws 18, 20 are made up of a series of axially interconnected flighted sections which present an inlet or feed section, an intermediate section, and a nose section for each of the screws. Thus, the screw 18 includes a flighted inlet section 58, an intermediate section 60, and a nose section 62. In like manner, the screw 20 has an inlet section 64, an intermediate section 66, and a nose section 68. It will further be observed that the flighting on the side-by-side screw sections 58, 64 and 60, 66 are intermeshed, this serving to increase the pumping efficiency of the overall extruder. However, the respective nose screw sections 62, 68 diverge from one another as they enter and are complementally received within a corresponding head section 36, 38 (see FIG. 1). At the die outlet end of the extruder, the screws 18, 20 are completely separate and not intermeshed.

The inlet screw sections 58, 64 are double flighted with the outwardly extending flighting convolutions 70, 72 being intermeshed along the entire length of the inlet section. The primary purpose of the inlet section is to rapidly convey material from the inlet 14 for compression and cooking within the intermediate and final sections of the extruder device.

The intermediate screw sections 60, 66 are likewise double flighted, but the outwardly extending flighting convolutions 74, 76 are of shorter pitch than the convolutions 70, 72 of the inlet screw sections. In other instances, however, the convolutions 74, 76 may be equal in pitch to the convolutions 70, 72. Moreover, and referring specifically to FIG. 1, it will be seen that the overall intermediate screw sections 60, 66 are made up of a total of five axially aligned and interconnected sub-sections (namely sub-sections, 78, 80, 82, 84 and 86 for intermediate screw section 60, and sub-sections 88, 90, 92, 94 and 96 for the intermediate screw section 66). It will be observed in this regard that the flighting pattern for all of the intermediate screw sub-sections are identical, and that the sub-sections 82, 92 include an interruption or cut flight portion 98, 100 along the length thereof. Such cut flighting serves to increase the residence time of the material within the intermediate section, and to enhance the mixing of the material.

The nose screw sections 62, 68 are again double flighted, and are connected to the corresponding intermediate screw sub-sections 86, 96. The flighting convolutions 102, 104 of the sections 62, 68 are at a somewhat greater pitch than the corresponding flighting convolutions 76, 78 of the intermediate screw section. Although the above described flighting pattern (i.e., double flighting, flighting pitch and use of cut flight screw sub-sections) has been found to be advantageous, those skilled in the art will readily appreciate that a wide variety of other flighting patterns could be employed.

Again referring to FIG. 1, it will be seen that three respective series of lobe-type mixing elements are provided along the length of the screws 18, 20. Specifically, a set of mixing elements 106 is situated between the forwardmost ends of the inlet screw sections 58, 64, and the rearmost ends of the intermediate screw sections 60, 66; a set 108 is positioned between the cut flight intermediate screw sub-sections 82, 92, and the adjacent screw sub-sections 84, 94; and the final set 110 is positioned between the intermediate screw sub-sections 84, 94, and the subsections 86, 96.

Figure 5:
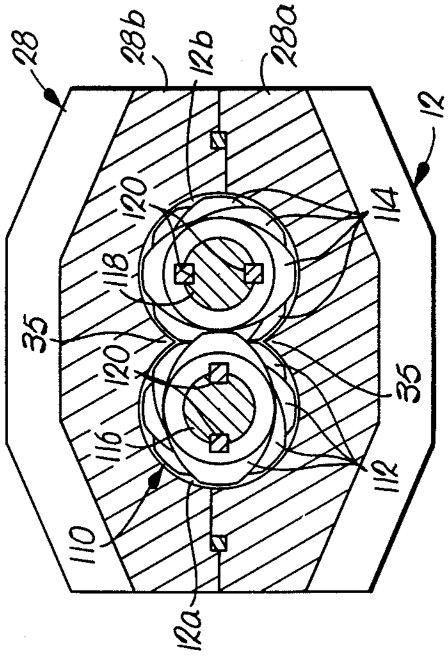
FIG. 5 is a sectional view taken along line 5—5 of FIG. 1 which illustrates the eliptical lobe-type mixing element employed.

Attention is next directed to FIG. 5 which illustrates in detail the configuration of the mixing set 110. As can be seen, a total of four lobe-shaped mixing elements 112 are positioned with and form a part of the overall screw 18, and similarly a total of four mixing elements 114 form a part of the adjacent screw 20. Each element 112, 114 includes a circular, innermost connection portion, as well as a pair of outwardly extending, opposed lobes presenting outermost, flattened faces. The elements 112, 114 are situated in relative side-by-side adjacency, and each of the elements is situated rotationally so as to not interfere with the juxtaposed mixing element during rotation thereof.

The mixing element set 108 is identical in all respects to the set 110, while the set 106 includes only three, somewhat thicker, lobe-type mixing elements on each screw 18, 20. In all other respects, the set 106 is identical to the sets 108, 110.

Figure 7:
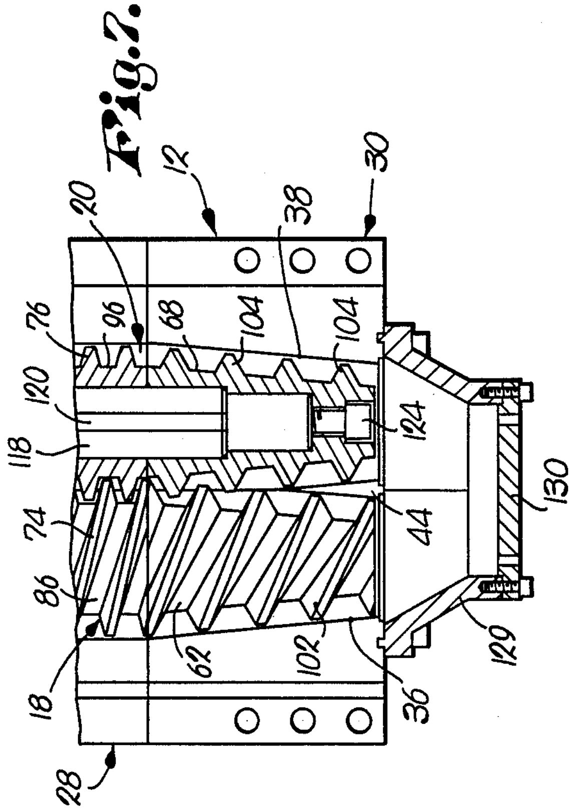
FIG. 7 is a fragmentary view in partial section illustrating the outlet end of an extruder in accordance with the invention, depicting the use of a frustoconical die spacer between the ends of the adjacent extruder screws and a common apertured die plate.

The respective screw sections and lobe-type mixing elements described above are of tubular central configuration, and are mounted on an appropriate, elongated, central drive shaft, 116, 118 (see FIGS. 5 and 7). Each of the drive shafts 116, 118 is provided with a pair of elongated, opposed keyways 120 in order to permit secure attachment of the respective screw components along the length thereof. The outermost end of each of the drive shafts 116, 118 is tapped and an endmost connecting bolt 122, 124 is employed to securely longitudinally fix the screw components onto the associated drive shafts.

Each of the screws 18, 20, is supported for axial rotation adjacent the rearmost end of barrel 12. Referring specifically to FIG. 1, it will be seen that sealing structure 126, 128 is provided for the screws. Of course, the screws are supported and powered for rotation by conventional bearing, motor and gear reducer means (not shown).

In alternate embodiments, the present invention can be provided with a wide variety of screw, die and barrel structures, depending upon desired end use. To give but one example (see FIG. 7), a common, converging, tubular die spacer 129 can be secured to the discharge end of barrel 12 in communication with the outlet ends of the respective head sections 36, 38. In addition, a common apertured die plate 130 is secured to the outermost end of spacer 129. In the use of an extruder as depicted in FIG. 7, the separate material streams passing out of the juxtaposed head sections 36, 38 are comingled within die spacer 129, and are thereupon extruded through the apertured die plate 130.

Figure 6:
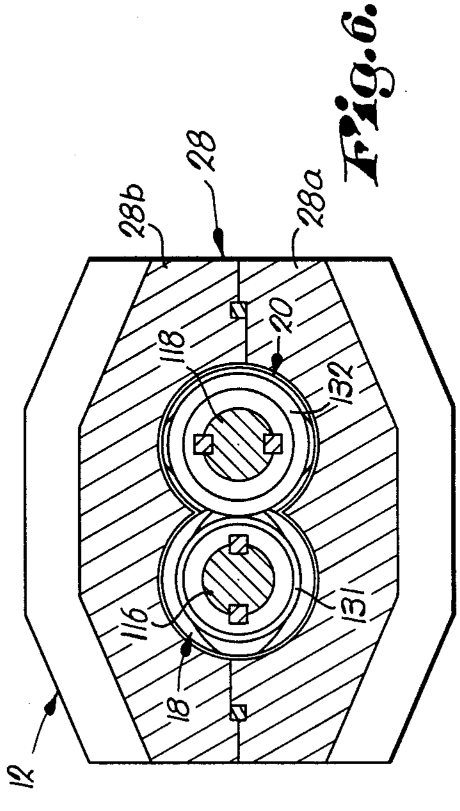
FIG. 6 is a view similar to that of FIG. 5, but depicts the use of circular mixing elements.

Another exemplary embodiment in accordance with the invention is illustrated in FIG. 6, which is similar to FIG. 5, but depicts the use of circular mixing elements. Specifically, it will be seen that side-by-side circular mixing element pairs 131, 132 are fixed onto the corresponding drive shafts 116, 118 of the screws 18, 20. The diameter of each element 132 is greater than that of the cooperating element 131, and the respective elements are designed such that their outer peripheries are in close proximity. Also, in a given mixing element set, use can be made of circular elements 131, 132, in conjunction with lobe-type mixing elements 112, 114.

In the operation of extruder 10, the material to be processed is fed into barrel 12 through inlet 14, and the screws 18, 20 are rotated (either in a counter-rotating or co-rotating fashion). This serves to advance the material along the length of the barrel 12, and to subject the material to increasing temperature and shear. Provision of the mixing element sets 106, 108 and 110 serves to enhance mixing of the material in order to ensure essential material homogeneity. In addition, use of the preferred cut flight screw sections along the length of the screws serves to impede the pumping action of the screws, and to assure thorough mixing of the material.

As the material being processed approaches the outlet end of the extruder, the material passes into the separate head sections 36, 38 and is thus split into separate, juxtaposed, non-communicating streams of material. At the same time, by virtue of the converging, frustoconical configuration of the head sections, the separate streams of material are subjected to compression.

An important feature of the present invention resides in the fact that, by virtue of the configuration of the outlet end of the extruder 10, the respective screws 18, 20 are provided with a bearing-type support adjacent the outlet end of the barrel 12. This occurs because of the fact that the separate streams of material passing through the head sections 36, 38 substantially evenly flow around and support the corresponding flighed nose sections 62, 68 which are rotating within the head sections.

Figure 8:
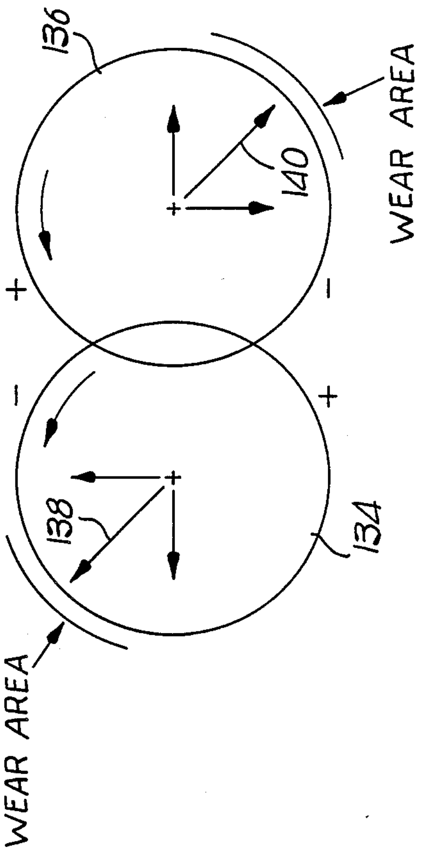
Fig.8. PRIOR ART
FIG. 8 is a schematic representation illustrating a prior art twin screw extruder, with the force vectors developed with such an extruder tending to separate the extruder screws and cause the same to experience undue wear also being shown.

Provision of a bearing-type support for the forward ends of the screws 18, 20 at the nose sections 62, 68, in conjunction with the conventional mechanical bearing support at the rear end of the screws, results in desirable screw support at both ends thereof, as opposed to the essentially cantilever bearing support typical of prior art twin screw extruders. In order to better understand the significance of this feature, attention is directed to FIG. 8 which is a schematic depiction of a prior art twin screw extruder. In such a machine, a pair of rotatable screws 134, 136 (here shown to be co-rotating) are provided within a surrounding barrel. During operation of the extruder when the screws 134, 136 rotate, corresponding high and low pressure regions (denoted by plus and minus signs respectively in FIG. 8) are developed at the region where the screws 134, 136 intermesh. These high and low pressure zones result from compaction of material at the zone of intermeshing of the screws. In any event, such pressure build-up at the region of screw intermeshing results in outwardly directed, resultant force vectors such as the vectors 138, 140. As can be readily appreciated from a study of FIG. 8, the net effect of the force vectors 138, 140 is a tendency of the adjacent screws 134, 136 to separate from one another. This can cause the screws to come into contact with the adjacent barrel walls, typically at the areas denominated "wear area" in FIG. 8. This tendency of extruder screws to separate in conventional twin screw designs, with consequent wearing engagement with the barrel walls, has been a persistent problem in the art. Indeed, in some instances such wearing contact can be heard as a "rumble" during operation of prior twin screw machines. However, because of the design of the twin screw extruder of the present invention, which affords bearing-type support at the forward or outlet end of the screws, this undue wear problem (and associated consequent down time and component cost considerations) is greatly minimized.

In addition to the foregoing, by virtue of the step of separating the flow of material into respective, juxtaposed substreams during passage thereof through the head sections 36, 38, the problem of velocity differentials within the twin screw machine is to some extent lessened. As noted above, one problem with prior twin screw machines has been the tendency of material passing therethrough to travel at different speeds, depending upon the region of the machine traversed (e.g., central region versus peripheral regions). However, because of the separate substreams obtained in the present invention, this differential flow rate problem is ameliorated. At the same time though, problems of stagnation and possible burning of the material are not present, because the flighted frustoconical nose screw sections 62, 68 rotate within the frustoconical head sections 36, 38, and thereby positively transport the materials towards and through the final die. However, because of the conical shape of the outlet heads 36, 38, good conversion of mechanical energy into heat is effected.

A wide variety of materials can be processed in the extruder of the invention. It is presently contemplated that the extruder hereof can be most advantageously used in connection with plant-derived materials such as wheat, corn, soy, rice and oats, but a virtually limitless variety of materials conventionally processed on extrusion equipment can be used with the extruder of the invention. Generally speaking, during normal operation of extruder 10, the screws 18, 20, should be rotated at a speed of from about 100 to 500 rpm, and temperature conditions within barrel 12 should be maintained within the range of from about 100 to 350° F. The pressure conditions within the barrel 12 should be maintained within the range of from about 10 to 1,500 psi. Usually, if plant-derived material is to be processed, such will be mixed with an amount of free water prior to being fed to the extruder. Again generally speaking, the total moisture content of material fed to the extruder 12 should be from about 12 to 35% by weight. Those skilled in the art will readily perceive, however, that the above described ranges are exemplary only, and many variations can be made depending upon the nature of the starting material employed, and the desired end product.

We claim:

1. An extruder, comprising:

an elongated barrel presenting an inlet end and an outlet end, a material inlet adjacent said inlet end thereof and a pair of separate, generally tubular, juxtaposed head sections proximal to said outlet end of the barrel and defining respective chambers separated by a central wall, each of said outlet end head sections being of decreasing cross-sectional area along the length thereof, said outlet end head sections serving to divide and receive material passing through said barrel, said elongated barrel having an outer surface that is imperforate between the outlet end head section and the outlet end of the barrel;

a pair of elongated, juxtaposed, axially rotatable flighted screws positioned within said barrel for moving material therethrough, each of said screws including an elongated, flighted, generally frustoconical outlet end screw section of decreasing cross-sectional area along the length of the outlet end screw section which is substantially complemental with a corresponding one of said outlet end sections, each of said outlet end screw sections having a rearward margin and a forward margin, the length of each of said outlet end screw sections being greater than he greatest diameter of the outlet end screw section, each of said outlet end screw sections having a peripheral helical flighting portion extending forwardly from said rearward margin of the outlet end screw section, each of said flighting portions intermeshing with the flighting portion of the other outlet end screw section by a predetermined depth of intermesh which progressively decreases the flighting portions extending forwardly from the rearward margins of said end screw sections until the flighting portions completely separate from each other at a point spaced rearwardly from said outlet end of said barrel, each of said outlet end screw sections extending into and being substantially complementally received by a corresponding outlet end head section for providing a bearing-type support for each of said flighted screws by virtue of passage of material into and through said head sections, and into surrounding relationship to the outlet end screw sections, during operation of said extruder;

restricted orifice die structure; and means mounting said die structure adjacent the outlet end of said barrel and in a spaced apart relationship to the forward margins of said outlet end section, the spacing between said outlet end section forward margins and said die structure being less than the length of one of said generally frustoconical outlet end sections.

2. The extruder as set forth in claim 1, said die structure comprising a pair of separate apertured die plates, each of said plates being secured to the outlet end of a corresponding tubular head section.

3. The extruder as set forth in claim 1, said die structure including a common tubular die spacer having first and second ends, the first end being secured to and in communication with the outlet ends of said tubular head sections, an apertured die plate being affixed to the second end of said spacer.

4. The extruder as set forth in claim 1, the longitudinal axes of said screws being substantially parallel.

5. The extruder as set forth in claim 1, portions of said flights on said screws being cut to impede a normal pumping action which is carried out by the screws.

6. The extruder as set forth in claim 1, said screws being co-rotating.

7. The extruder as set forth in claim 1, said screws beng counter-rotating.

8. The extruder as set forth in claim 1, including rotatable mixing elements situated along the length of said screws.

* * * * *